United States Patent [19]

Fisher, Jr. et al.

[11] Patent Number: 4,483,543
[45] Date of Patent: Nov. 20, 1984

[54] SEALS

[75] Inventors: Ernest P. Fisher, Jr., Carrollton; William G. Boyle, Dallas, both of Tex.

[73] Assignee: Otis Engineering Corporation, Dallas, Tex.

[21] Appl. No.: 459,058

[22] Filed: Jan. 19, 1983

[51] Int. Cl.³ .............................................. F16J 15/16
[52] U.S. Cl. ............................. 277/188 R; 277/207 A
[58] Field of Search .......... 277/207 A, 188 R, 188 A, 277/235 R

[56] References Cited

U.S. PATENT DOCUMENTS 3,188,099 6/1965 Johnson et al. ................ 277/188 A
3,279,805 10/1966 Quinson .......................... 277/188 R Primary Examiner—Robert I. Smith
Attorney, Agent, or Firm—Roland O. Cox

[57] ABSTRACT

A molded resilient ring seal with support rings mold bonded or bonded and connected to both ends.

The molded resilient material portion of the seal utilizes unique contouring to reduce internal resilient material stresses during use, enabling the seal to seal higher pressures at elevated temperatures for longer periods of time.

A number of support ring configurations are also disclosed, which further enhance sealing ability of the resilient material.

5 Claims, 8 Drawing Figures

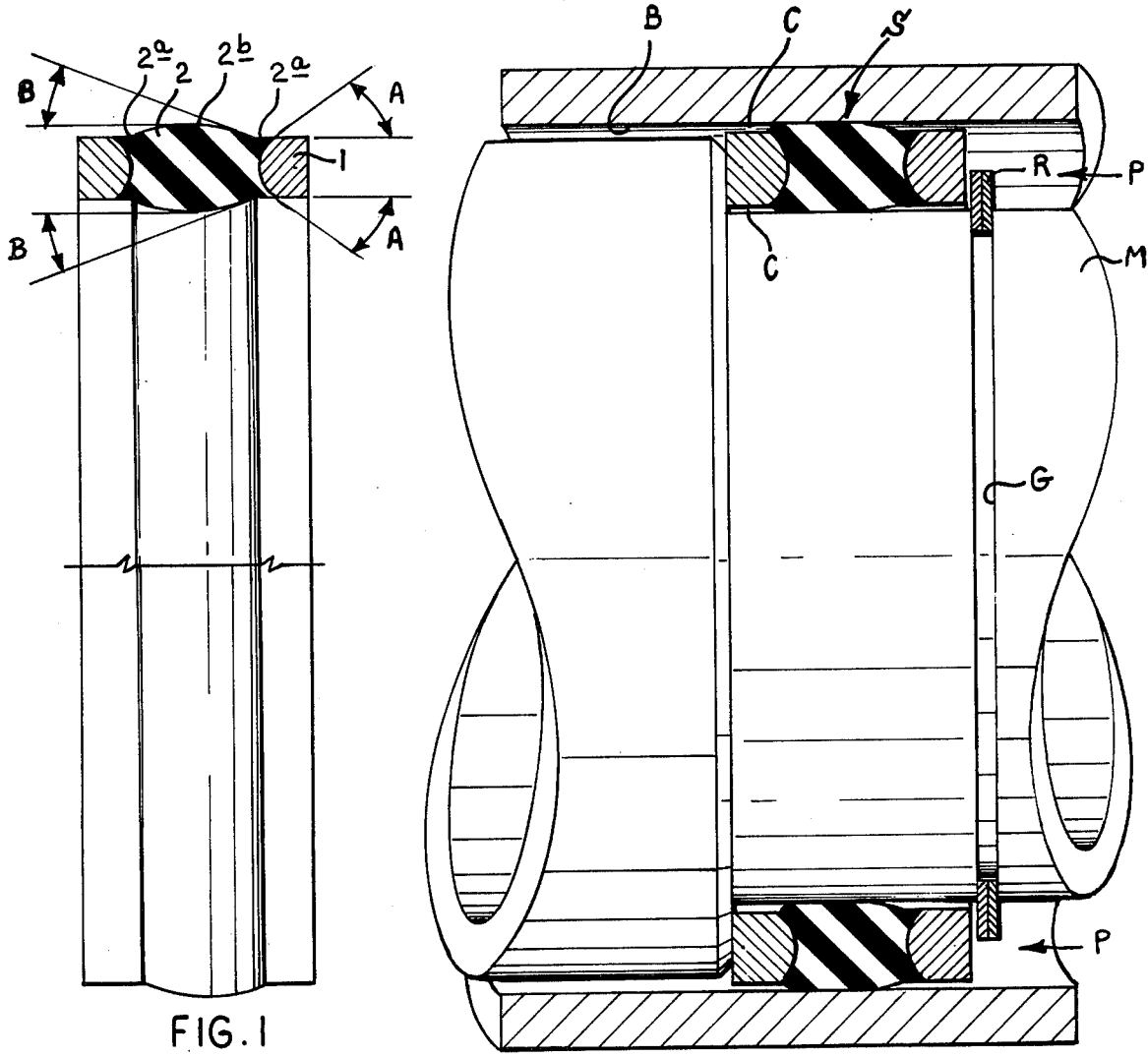
FIG. 1
FIG. 2
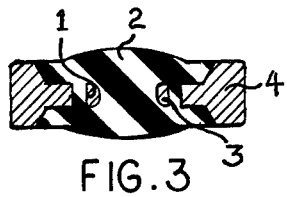
FIG. 3
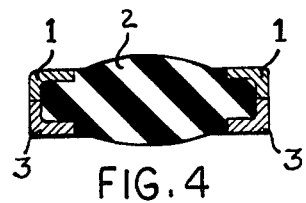
FIG. 4
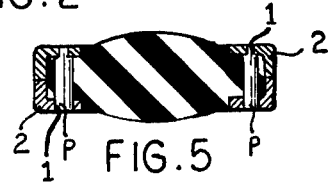
FIG. 5
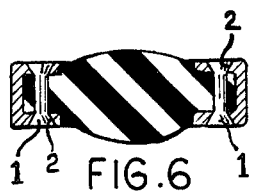
FIG. 6
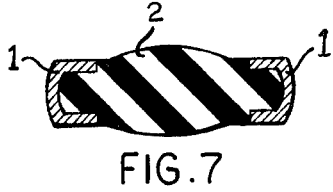
FIG. 7
FIG. 8

SEALS

FIELD OF THE INVENTION

This invention relates to ring seals and in particular to resilient ring seals with supporting and clearance closing end rings.

DESCRIPTION OF THE PRIOR ART

Molded seal elements such as those shown on page 26 of "Production Packer Equipment and Services", catalog publication OEC 512OD of Otis Engineering Corporation, P.O. Box 34380, Dallas, Tex. 75234, have been successfully used to sealingly engage and maintain pressure seals between well tools and well tools and tubing or casing used in earth wells.

Seals of the type shown in U.S. Pat. No. 4,109,716 to Carlos R. Canalizo entitled "SEAL" have been used to effectively seal tools at desired depths inside well tubulars. Another example of a similar seal is shown in U.S. Pat. No. 4,305,595 to Miyagishima and Carbaugh.

The aforementioned seals are of the diametral "interference" type. A diametral interference type seal is typified by the inside diameter of the seal being smaller than the tool mandrel outside diameter over which it is installed and the expanded outside diameter of the seal being greater than the inside diameter of the seal bore into which the seal is inserted and radially compressed to sealingly engage.

Pressure differential sealing ability of interference seals is dependent on many factors including strength of the resilient material in compression, in tension, and in shear and percent loss of those strengths because of elevated temperatures and chemical attack in earth wells, the amount of resilient material interference and the amount of clearance between tool outside diameter or seal supporting end ring outside diameters and the inside diameter of the bore engaged by the seal.

The aforementioned seal elements typically utilize a great amount of diametral interference. Supporting rings of harder, stronger material are usually connected to the resilient seal material by bonding during the molding process. The large amount of interference and bonded supporting rings are required to withstand high temperatures and pressures encountered in modern deeper earth wells. One result of this large amount of interference is that a large longitudinal force is required to radially expand the resilient seal material when installing over a tool mandrel and to radially compress the resilient material to insert into a bore for sealing engagement. Forced insertion and resulting stress concentrations at support ring corners frequently tear the support ring bonds. Shear stresses induced into the resilient material also contribute to permanent damage to the seal. As increasing pressure differentials are placed on the engaged seal, connecting bonds may be partially or completely destroyed, and the resilient material is forced into any clearance between end support rings and seal bores inducing shear, tensile and/or compressive stresses into the material at the seal material/support ring interface. Excessively high pressures can cause extrusion of the resilient material through very small clearances resulting in complete seal failure.

SUMMARY OF THE INVENTION

A molded seal configuration of the present invention utilizes generously radiused convex internal and external resilient material contours bonded at both ends to support rings which are also convexly radiused on their bonded surfaces. Tests of this seal configuration reveal that much lower insertion forces are required for a given amount of diametral interference. When using wireline methods for installing tools in tubing seal bores, great forces for radial seal compression and insertion are not available. These seals are not easily damaged by insertion and high pressures, as the radiused resilient material and support rings effectively reduce or eliminate inducement of excessive compressive and shear stresses into the resilient material and ring to seal bonds remain intact much longer.

As elevated temperatures encountered in today's deep earth wells cause softening of resilient materials used for molded seals, high pressures present may tear resilient material-support ring bonds and cause extrusion of softened seal materials through very small support ring-seal bore clearances, resulting in seal failure. Configurations of the present invention seals utilize the uniquely contoured resilient material with pressure deformable support rings which reduce or eliminate clearance between support ring outside diameters and seal bore inside diameters to enhance seal pressure holding capabilities.

Other molded seal embodiments of this invention disclose support ring configurations which provide seal-to-support ring connection after bond failure, deformable support ring configurations to reduce or close support ring-bore clearances, and combination connected and deformable support rings.

An object of this invention is to provide a seal ring requiring less force to install on a seal mandrel and to insert into a seal bore.

Another object of this invention is to provide a seal ring wherein resilient material stresses induced by sealing great pressure differentials are greatly minimized.

Another object of this invention is to provide a seal ring configuration which prevents excessive resilient seal material stress concentrations around end support rings.

An object of this invention is to provide seal support ring configurations which enhance sealing ability by remaining connected to the resilient material after resilient material-support ring mold bonds partially or totally fail.

Also, an object of this invention is to provide seal support rings which further enhance the sealing ability of the unique resilient material configuration by reducing or closing the clearances sealed.

Also, another object of this invention is to provide support rings for a resilient seal which both reduce sealed clearances and are mechanically connected to the resilient material.

BRIEF DESCRIPTION OF THE DRAWING

FIG. 1 is a half-sectioned elevational view of the seal of this invention with radiused end support rings.

FIG. 2 is a view in elevation of the seal of FIG. 1 on a tool mandrel inserted into and sealingly engaging a seal bore.

FIG. 3 is a cross-sectional view of the seal of this invention with connected support rings.

FIG. 4 is a view in cross-section of the seal of this invention with deformable two-piece support rings.

FIG. 5 is also a cross-sectional view of the seal of this invention with deformable connected support rings.

FIG. 6 is a cross-sectional view of the seal of this invention with connected one-piece support rings.

FIG. 7 is another cross-sectional view of the invention seal with deformable support rings.

FIG. 8 is a cross-sectional view of the seal of this invention with connected deformable support rings.

DESCRIPTION OF THE PREFERRED EMBODIMENTS

FIG. 1 shows the basic molded resilient seal configuration of this invention wherein radiused one end support rings 1 are connected to both ends of a resilient moldable material portion 2, which is formed and connected by bonding to the support rings during the molding process. Typical of the resilient material portion 2 are a middle section 2b, which is curved convexly on the outside and inside surfaces, and cylindrical sections 2a formed on both ends of section 2b. The centers and magnitudes of radii forming the outside and inside of section 2b are selected by design calculation to intersect the cylindrical sections 2a outside and inside near the support rings for minimum cross-section compression and ease of installing the seal over a mandrel or into a seal bore. Sufficient resilient material and space for material movement is provided without the material being compressed between support rings and seal bore, and possibly cut. High pressure differentials are sealingly retained without high shear and compressive stresses in the resilient material near the support rings. For this purpose, angles B in FIG. 1 should be preferably 5–30 degrees and less than 40 degrees resulting in lower over mandrel installation and seal bore entry forces as angles B decrease during installation and insertion in a seal bore.

Resilient material compressive and shear stresses are minimized, when sealing high differential pressures, by the large radius support rings which also provide greater surface areas for enhanced connecting bonds of resilient material to support rings. Angles A, FIG. 1, have been determined to be preferably 30–35 degrees, within a workable range of 15–75 degrees.

FIG. 2 shows the seal of FIG. 1 installed over tool mandrel M and retained in sealing engagement on the tool mandrel smooth turned outside diameter by retaining ring R engaged in groove G. The tool mandrel with seal S has been inserted into and sealingly engages seal bore B, and pressure differential P force has moved the molded resilient material toward the support ring-seal bore and turn clearances C.

FIG. 3 shows the molded seal portion 2 of FIG. 1 with support rings of a cross-section which remain connected to the resilient material even though the mold formed connecting bond between support ring and resilient material partially or totally fails. This additional molded connection has been found to increase the longevity and/or the pressure holding capability of seals not having connected support rings. A number of openings 1 are formed in a tongue portion 3 of the support rings 4. During the molding process, resilient material bonds to the support rings and bonds to itself through the openings, providing the additional mechanical connection.

FIG. 4 shows the seal portion 2 of FIG. 1 to which four "L" cross-section concentric support rings 1 and 3 form an inward facing "U" cross-section and are bonded at each end to the resilient material during molding. As differential pressure thrust moves and compresses sealingly engaged resilient seal material, the deformable supports away from high pressure are deformed and spread by the compressed resilient material within to close clearances sealed and increase the pressure holding ability of the seal.

FIG. 5 shows the bonded seal material and support rings of FIG. 4 wherein a number of shouldered pins P have been installed from inside through holes or openings 1 in "U" section support rings (pair of 2's) to keep the pins from falling out. The resilient material is molded around and bonded to the pins to provide a mechanical connection after bond failure.

FIG. 6 shows one-piece "U" cross-section end support rings mechanically connected to the molded material by molding around pins 1 bradded in support ring openings 2.

FIG. 7 shows deformable one-piece "U" section support rings 1 bonded to the molded seal portion 2 of FIG. 1. The support rings of FIG. 7 (like those of FIG. 4) may be deformed by compressive forces induced in the resilient seal material by differential pressure thrust and spread to reduce support ring-seal bore clearances and increase differential pressures held by the seal. If deforming forces become great enough, the deformable support rings may be moved outwardly and inwardly far enough to contact the outside of the seal mandrel and inside of the seal bore and close clearances into which the resilient material may be forced or possibly extruded through, increasing to a maximum pressure holding capabilities of the seal. If deforming force induced stresses exceed the support ring material elastic limit, the support rings will be permanently deformed and not return to their original shape when deforming force is reduced.

FIG. 8 shows the seal of FIG. 7 wherein the deformable support rings have been rolled or crimped inwardly to remain connected to the molded resilient material portion after the support ring-resilient material bond has been partially or totally destroyed.

We claim:

1. A seal ring comprising end support rings, each said ring having a flat outer end and an inner end convexly radiused tangent to lines forming angles of 15 to 75 degrees, preferably 30 degrees, with the outside and inside support ring surfaces, one said support ring bonded to each end of a resilient material portion having a cylindrical end section, a middle contoured ring section and another cylindrical end section wherein the outside of said contoured ring section curves radially outward from the outside of one of said cylindrical end sections to a larger diameter and curves radially inward from said larger diameter to the outside of the other end section, and the inside of said contoured section curves radially inward from the inside of one of said cylindrical end sections to a smaller diameter and curves radially outward from said smaller diameter to the inside of the other cylindrical end section, and said inward and outward curves are blending radii tangent to lines forming angles of 5 to 30 degrees, preferably 15 degrees, with the outside and inside surfaces of said cylindrical end sections.

2. The seal ring of claim 1 wherein the resilient material is moldable.

3. The seal ring of claim 1 wherein said end support rings are a ferrous metal.

4. The seal ring of claim 1 wherein said end support rings are monel.

5. The seal ring of claim 1 wherein said support rings are titanium.

* * * * *

UNITED STATES PATENT AND TRADEMARK OFFICE
CERTIFICATE OF CORRECTION

PATENT NO. : 4,483,543
DATED : November 20, 1984
INVENTOR(S) : Ernest P. Fisher, Jr.

It is certified that error appears in the above-identified patent and that said Letters Patent is hereby corrected as shown below:

On the title page, delete "William G. Boyle, Dallas" as co-inventor.

Signed and Sealed this

Ninth Day of April 1985

[SEAL]

Attest:

DONALD J. QUIGG

Attesting Officer

Acting Commissioner of Patents and Trademarks